Patented Oct. 31, 1950

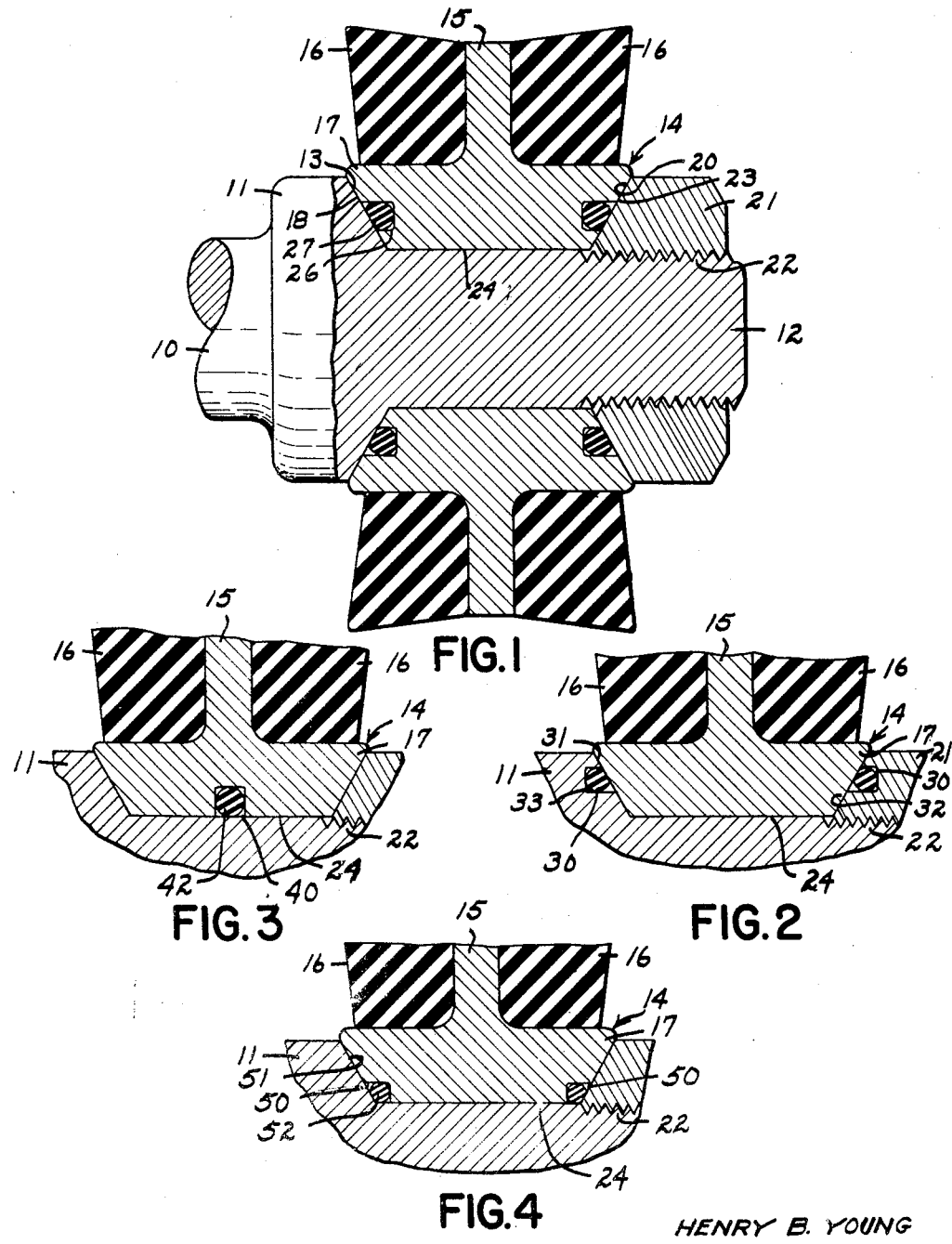

2,528,104

UNITED STATES PATENT OFFICE 2,528,104

SLUSH PUMP PISTON ROD ASSEMBLY

Henry B. Young, Houston, Tex., assignor to Mission Manufacturing Company, Houston, Tex., a corporation of Texas Application June 2, 1947, Serial No. 751,701

2 Claims. (Cl. 309—17)

This invention relates to a pump piston and has for an object to provide an improved piston, particularly of the slush pump type, which is to be employed in high pressure pumps handling more or less abrasive material, without danger of leakage, particularly between the piston and the piston rod.

An object of the invention is to provide a substantially leak-proof connection and seal between the piston and the piston rod of a high pressure slush pump.

Many attempts have been made to solve the problem of leakage between the piston and piston rod of high pressure slush pumps, but frequent washouts occur with conventional equipment, and it is an object of this invention to obviate these washouts.

A further object of this invention is to provide a leakage eliminating means of sealing the piston to the piston rod of a high pressure slush pump or similar pump.

Other and further objects of this invention will be readily apparent when the following description is considered in connection with what is hereinafter claimed and the accompanying drawing wherein;

Fig. 1 a sectional view of a piston and piston rod showing one form of this invention.

Figs. 2, 3 and 4 are similar but fragmentary views each of different forms of this invention.

The piston rod 10 is provided with an annular flange 11 from which extends a reduced piston receiving cylindrical neck 12 connected thereto by an angular face 13, here shown as forming an angle of about 60° for illustrative purposes, but which may be of any suitable angle, even straight or reentrant. The piston 14 is shown as a one piece piston body 17 with a central radial flange 15 on opposite sides of which there are the conventional packing seals or rubbers 16.

The piston body 17 is provided with end faces 18 and 20 complementary to the angular face 13 of the piston rod flange 11, and a rod nut 21, adapted to be threaded onto the threaded end 22 of the piston rod neck 12, has an angular face 23 complementary to the piston body face 20. A cylindrical bore 24 extends through the piston body 17 of such diameter as to have a fairly snug fit on the piston rod neck 12. The description thus far applies equally to each of the different illustrated forms of this invention.

The essence of this invention is in providing a leak proof seal between the piston body 17 and piston rod neck 12, that is, to prevent seepage between the piston rod neck 12 and the piston body bore 24. In the form of the invention shown in Fig. 1, an annular recess 26 is provided in end faces 18 and 20 of the piston body 17, and placed in each annular recess 26 is an O-ring 27, of suitable material, such as natural or synthetic rubber or of other suitable plastic material. As will be apparent, this O-ring 27 of suitable shape in cross-section has its annulus diameter somewhat larger than the depth of the recess 26, so that when finally assembled and tightened down, it will be somewhat compresed and thus form a tight and sealing fit between the piston body end faces 18 and 20 and the angular faces 13 and 23 on the piston rod flange 11 and rod nut 21. As will also be apparent, the O-ring and recess at the nut end could be omitted, and the seal at the angular face 13 could be alone relied on, but the seals at both ends are preferred so as to provide a symmetrical piston body which could be assembled from either end, and would be better balanced in operation. In assembling, the nut 21 would be sufficiently tightened to press the piston body against the angular face 13 of the piston rod flange 11 and thus compress the O-rings in the recesses to a sealing fit therein against the end faces.

The essence of this invention is carried out in each of the forms shown in Figs. 2, 3 and 4.

In Fig. 2, the recesses 30 are shown as being located in the angular face 31 of the piston rod flange 11 and in the angular face 32 of the rod nut 21, with an O-ring 33 in each of them.

In Fig. 3, but a single recess 40 is provided in the bore 24 of the piston body 17 to receive the single O-ring 42.

In Fig. 4, the recesses 50 are located in the angles formed by the piston body angular faces 51 and the bore 24 to receive the O-rings 52.

It will be observed that a symmetrical piston body is provided in each of the forms of this invention, and that while the sealing O-ring and recesses have been shown in one or the other of the contacting surfaces, it could equally well be located in both surfaces or intermediate both surfaces, and if desired, sealing O-rings and recesses of two or more of the forms could be all used in a single form.

While the O-ring is shown as being circular in cross section, it is not necessarily so, but may be rectangular or oblong in cross section, so long as its thickness in the direction of the depth of the recess is greater than such depth of the recesses, so that the O-ring will be compressed somewhat as the final assembly takes place.

What is claimed is:

1. Means for sealing a pump piston on a piston rod to prevent leakage therebetween comprising a piston body and piston rod having complementary contacting surfaces inclined with respect to the axis of said rod, said body having a radial flange thereon, packing rubbers mounted on said body above said surfaces and adjacent said flange, means for applying pressure to hold said surfaces in tight metal-to-metal contact, and compressed sealing ring means countersunk into at least one of each pair of the contacting complementary surfaces between the piston and piston rod to provide a fluid tight seal in combination with said metal seal, said contacting surfaces of said piston rod comprising an angular face connecting an annular flange to a reduced cylindrical neck, the end of said neck being threaded, the body of the piston having a cylindrical bore therethrough connecting angular faces at each end, said pressure applying means comprising a nut adapted to be threaded on the threaded end of said neck, its contacting face being angular and complementary to the angular face of the piston, said contacting surfaces of said piston having said countersunk ring disposed intermediate the inner and outer edges so that the resilient seal is between the metal to metal seals.

2. A slush pump piston and rod combination comprising an annular piston body, a piston rod opening extending therethru, a beveled face at each end of said body around such opening, an annular groove intermediate the inner and outer edges of each face, a resilient seal ring in each groove, a rod having a beveled shoulder to fit one of said piston faces, a threaded end, a nut for such end, a beveled inner end on said nut to fit the other piston face to provide inner and outer metal to metal seals at each end with the resilient seal disposed intermediate thereof.

HENRY B. YOUNG.

REFERENCES CITED

The following references are of record in the file of this patent:

UNITED STATES PATENTS

| Number | Name | Date |
|---|---|---|
| 1,612,038 | Miller | Dec. 28, 1926 |
| 2,180,795 | Christensen | Nov. 21, 1939 |
| 2,283,460 | Pumphrey | May 19, 1942 |
| 2,332,763 | Stewart | Oct. 26, 1943 |
| 2,417,887 | Schmidt | Mar. 25, 1947 |
| 2,429,426 | Phillips et al. | Oct. 21, 1947 |